(No Model.)

J. B. BREWER & J. H. CORSBIE.
HARROW AND PULVERIZER.

No. 352,440. Patented Nov. 9, 1886.

Witnesses

Inventors
John B. Brewer
James H. Corsbie
By their Attorneys

UNITED STATES PATENT OFFICE.

JOHN B. BREWER AND JAMES H. CORSBIE, OF HARTSELL'S, ALABAMA, SAID CORSBIE ASSIGNOR TO SAID BREWER.

HARROW AND PULVERIZER.

SPECIFICATION forming part of Letters Patent No. 352,440, dated November 9, 1886.

Application filed August 11, 1886. Serial No. 210,622. (No model.)

*To all whom it may concern:*

Be it known that we, JOHN B. BREWER and JAMES H. CORSBIE, citizens of the United States, residing at Hartsell's, in the county of Morgan and State of Alabama, have invented a new and useful Improvement in Harrows and Pulverizers, of which the following is a specification.

Our invention relates to an improvement in harrows and pulverizers; and it consists in the peculiar construction and combination of devices, that will be more fully set forth hereinafter, and particularly pointed out in the claims.

Figure 1:
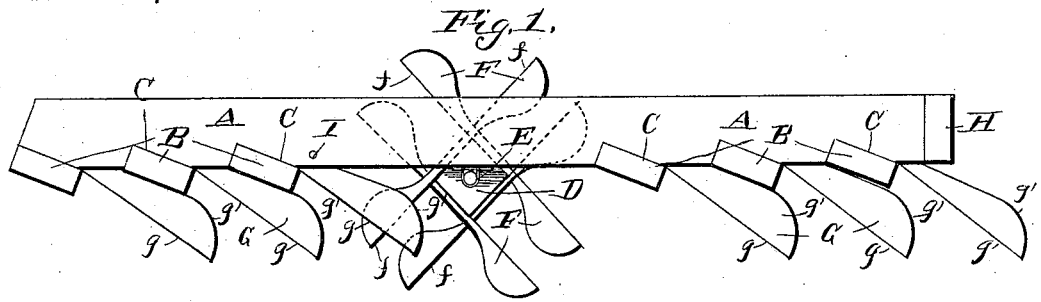
Figure 2:
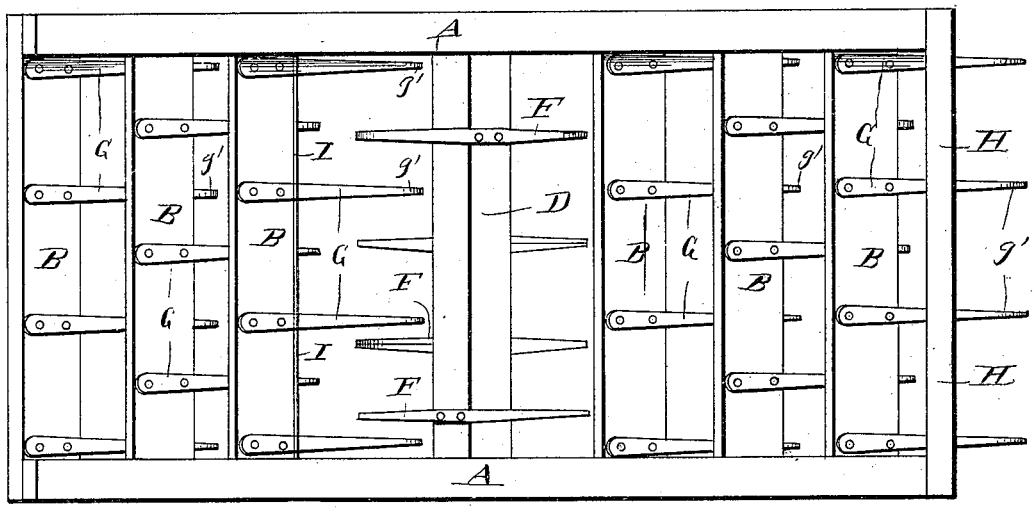
Figure 3:
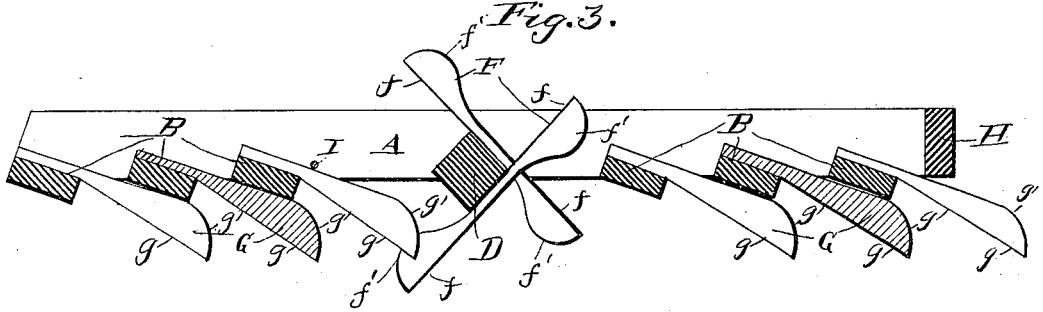

In the drawings, Figure 1 is a side elevation of a harrow and pulverizer embodying our improvements. Fig. 2 is a top plan view of the same. Fig. 3 is a vertical longitudinal section.

The harrow-frame consists of the side beams, A, which are connected together on their lower sides by transverse cross-bars B. The said cross-bars are arranged obliquely in oblique recesses C, that are made on the under sides of the side beams, and the said cross-bars are arranged at a slight distance apart, so as to leave spaces between them. The cross-bars are located only at the front and rear ends of the frame, the central portion thereof being left open.

D represents an axle or shaft, which is journaled in bearings E, that are secured at the centers of the side beams, A, and the under sides thereof. This shaft or axle is square, and through its sides are bolted radially-extending double-ending cutting-teeth F. These teeth are each provided with a straight cutting-edge, $f$, and a curved rear edge, $f'$.

G represents a series of cutting-teeth, which have their shanks bolted to the upper sides of the cross-bars B, and the said teeth extend downwardly and rearwardly from each bar, and have their upper edges bearing against the lower side of the cross-bar, in rear of the one to which they are attached. By this arrangement it will be understood that the teeth are firmly braced in position, and thereby greatly strengthened. The said teeth G are also provided with sharpened straight front cutting-edges, $g$, and curved rear edges, $g'$. The extreme rear ends of the side beams, A, of the frame are connected by the cross-bar H, which is arranged vertically, and has its lower edge bearing against the rear edges of the teeth attached to the rear cross-bar, B.

I represents a rod, which connects the side beams, A, and extends above the rear cross-bar of the front series, which is immediately in advance of the shaft C, and bears upon the upper sides or edges of the teeth attached to the said cross-bar.

The operation of our invention is as follows: When the machine is drawn across the field, the teeth G penetrate the soil to a considerable depth, and cut and break sticks and trash therein, and the shaft D is caused to rotate, thereby forcing its teeth F into the earth, and assisting in the process of pulverizing the ground and cutting and breaking the trash. The inclined cross-bars B scrape and level the ground.

Having thus described our invention, we claim—

1. The combination, with a harrow and pulverizer having the cross-bars B, of the cutting-teeth having their stems attached to the upper sides of each cross-bar, the rear edges of the said teeth bearing under the cross-bar in rear of the one to which they are attached, for the purpose set forth, substantially as described.

2. The combination, in a harrow and pulverizer, of the frame having the cross-bars B, the inclined teeth having their stems attached to the cross-bars, each tooth having its rear side bearing under the cross-bar in rear of the one to which it is attached, and the rotating shaft journaled in the frame and having the radial cutting-teeth, substantially as described.

In testimony that we claim the foregoing as our own we have hereto affixed our signatures in presence of two witnesses.

JOHN B. BREWER.
JAMES H. CORSBIE.

Witnesses:
P. B. BRITNELL,
JOHN W. LOTHRIDGE.